(12) United States Patent
Vinnakota et al.

(10) Patent No.: US 10,644,970 B2
(45) Date of Patent: May 5, 2020

(54) TRACKING APPLICATION UTILIZATION OF MICROSERVICES

(71) Applicant: Sony Interactive Entertainment LLC, San Mateo, CA (US)

(72) Inventors: Nithya Vinnakota, Fremont, CA (US); Aditya Kappagantula, Burlingame, CA (US); Hari Dattada, Dublin, CA (US); Janhavi Digraskar, Alameda, CA (US)

(73) Assignee: SONY INTERACTIVE ENTERTAINMENT LLC, San Mateo, CA (US)

( * ) Notice: Subject to any disclaimer, the term of this patent is extended or adjusted under 35 U.S.C. 154(b) by 104 days.

(21) Appl. No.: 16/032,091

(22) Filed: Jul. 11, 2018

(65) Prior Publication Data
US 2020/0021505 A1   Jan. 16, 2020

(51) Int. Cl.
*H04L 12/26* (2006.01)
*H04L 12/733* (2013.01)
(Continued)

(52) U.S. Cl.
CPC .......... *H04L 43/06* (2013.01); *H04L 41/0806* (2013.01); *H04L 41/50* (2013.01);
(Continued)

(58) Field of Classification Search
CPC ......... H04L 43/06; H04L 43/04; H04L 43/10; H04L 41/50; H04L 41/0806; H04L 67/32; H04L 45/20
See application file for complete search history.

(56) References Cited

U.S. PATENT DOCUMENTS 8,392,578 B1   3/2013 Donovan et al.
9,509,782 B2 * 11/2016 Lawson ................ H04L 65/403
(Continued)

FOREIGN PATENT DOCUMENTS

CN   110168969 A   8/2019
CN   110168970 A   8/2019
(Continued)

OTHER PUBLICATIONS

"International Search Report" and "Written Opinion of the International Searching Authority," Patent Cooperation Treaty Application No. PCT/US2019/039594, dated Oct. 2, 2019, 9 pages.
(Continued)

*Primary Examiner* — Michael C Lai
(74) *Attorney, Agent, or Firm* — Carr & Ferrell LLP

(57) ABSTRACT

Methods and systems for tracking client application utilization of microservices are provided. Exemplary methods include: requesting completed hop data records, the completed hop data records being associated with a plurality of microservices, a hop being between two microservices of the plurality of microservices; receiving the completed hop data records; aggregating the completed hop data records to identify hop data records associated with a client application, count a number of instances the client application utilized each microservice of the plurality of microservices, and calculate an average latency for each hop; and provisioning and/or decommissioning instances of the plurality of microservices using the aggregated hop data records.

20 Claims, 7 Drawing Sheets

(51) Int. Cl.
*H04L 12/24* (2006.01)
*H04L 29/08* (2006.01)

(52) U.S. Cl.
CPC .............. *H04L 43/04* (2013.01); *H04L 43/10* (2013.01); *H04L 45/20* (2013.01); *H04L 67/32* (2013.01)

(56) References Cited

U.S. PATENT DOCUMENTS

| | | | |
|---|---|---|---|
| 10,048,830 B2* | 8/2018 | Jose | G06F 3/04817 |
| 10,263,859 B2 | 4/2019 | Morgan et al. | |
| 2003/0231621 A1 | 12/2003 | Gubbi et al. | |
| 2009/0125625 A1 | 5/2009 | Shim et al. | |
| 2011/0023096 A1 | 1/2011 | Xiao et al. | |
| 2011/0055726 A1 | 3/2011 | Hamilton, II et al. | |
| 2011/0264778 A1 | 10/2011 | McGregor et al. | |
| 2011/0314077 A1 | 12/2011 | Pala et al. | |
| 2012/0102132 A1 | 4/2012 | Lee | |
| 2013/0044582 A1 | 2/2013 | Ahmed | |
| 2014/0153422 A1 | 6/2014 | Nambiar et al. | |
| 2015/0161752 A1 | 6/2015 | Barreto et al. | |
| 2015/0237383 A1 | 8/2015 | Riedl et al. | |
| 2015/0375113 A1 | 12/2015 | Justice et al. | |
| 2016/0248861 A1 | 8/2016 | Lawson et al. | |
| 2016/0301617 A1 | 10/2016 | Peterson et al. | |
| 2017/0046146 A1* | 2/2017 | Jamjoom | G06F 8/62 |
| 2017/0160880 A1* | 6/2017 | Jose | G06F 8/34 |
| 2018/0198690 A1 | 7/2018 | Morgan et al. | |
| 2018/0198733 A1 | 7/2018 | Morgan et al. | |
| 2018/0234319 A1* | 8/2018 | Suri | H04L 43/0882 |
| 2019/0179663 A1* | 6/2019 | Xu | G06F 3/067 |
| 2019/0220305 A1* | 7/2019 | Festa | G06F 9/4843 |

FOREIGN PATENT DOCUMENTS

| | | |
|---|---|---|
| EP | 3568931A1 A1 | 11/2019 |
| EP | 3568932A1 A1 | 11/2019 |
| WO | WO2018132173 A1 | 7/2018 |
| WO | WO2018132172 A1 | 8/2018 |
| WO | WO2020013999 A1 | 1/2020 |

OTHER PUBLICATIONS

Atkisson, Brian, "The Truth About Microservices," DZone, May 5, 2017 [retrieved on Sep. 1, 2019], Retrieved from the Internet: <URL:https://www.dzone.com/articles/the-truth-about-microservices>, 34 pages.

Swersky, Dave, "The Hows, Whys and Whats of Monitoring Microservices," The New Stack, Jun. 21, 2018 [retrieved on Sep. 1, 2019], Retrieved from the Internet: <URL:https://thenewstack.io/the-hows-whys-and-whats-of-monitoring-microservices/>, 15 pages.

Viennot, Nicolas et al., "Synapse: A Microservices Architecture for Heterogeneous-Database Web Applications," Proceedings of the Tenth European Conference on Computer Systems, Apr. 21, 2015 [retrieved on Sep. 1, 2019], Retrieved from the Internet: <URL:https://roxanageambasu.github.io/publications/eurosys2015synapse.pdf>, 16 pages.

"International Search Report" and "Written Opinion of the International Searching Authority," Patent Cooperation Treaty Application No. PCT/US2017/061383, dated Jan. 19, 2018, 8 pages.

"International Search Report" and "Written Opinion of the International Searching Authority," Patent Cooperation Treaty Application No. PCT/US2017/061391, dated Jan. 19, 2018, 8 pages.

Ye, Meng et al., "System-Performance Modeling for Massively Multiplayer Online Role-Playing Games," IBM Systems Journal, vol. 45, No. 1; Jan. 20, 2006, pp. 45-58.

Shaikh, Anees et al., "On Demand Platform for Online Games," IBM Systems Journal, vol. 45, No. 1; Jan. 11, 2006, pp. 7-19.

djrutland1 et al., "An Evolution of a Self Confessed Video Games Snob," djrutland1 [online], Mar. 17, 2013 [retrieved on Jul. 10, 2018], Retrieved from the Internet: <URL:https://djrutland1.wordpress.com/page/22>, 21 pages.

\* cited by examiner

TRACKING APPLICATION UTILIZATION OF MICROSERVICES

FIELD OF THE INVENTION

The present technology pertains to applications provided on computer networks, and more specifically, to microservice applications provided on computer networks.

BACKGROUND ART

The approaches described in this section could be pursued but are not necessarily approaches that have previously been conceived or pursued. Therefore, unless otherwise indicated, it should not be assumed that any of the approaches described in this section qualify as prior art merely by virtue of their inclusion in this section.

Computer networks can use a distributed application structure that partitions tasks or workloads between the providers of a resource or service, called servers, and service requesters, called clients. Clients and servers can communicate over a computer network on separate hardware systems. A server host runs one or more server programs which share their resources with clients. A client does not necessarily share any of its resources, but requests a server's content or service function. Clients initiate communication sessions with servers which await incoming requests.

SUMMARY OF THE INVENTION

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

The present disclosure is related to various systems and methods for tracking microservice utilization. Specifically, a method for tracking microservice utilization may comprise requesting completed hop data records, the completed hop data records being associated with a plurality of microservices, a hop being between two microservices of the plurality of microservices; and receiving the completed hop data records. Some embodiments may further include: aggregating the completed hop data records to identify hop data records associated with a client application, count a number of instances the client application utilized each microservice of the plurality of microservices, and calculate an average latency for each hop; and provisioning and/or decommissioning instances of the plurality of microservices using the aggregated hop data records.

BRIEF DESCRIPTION OF THE DRAWINGS

Embodiments are illustrated by way of example, and not by limitation, in the figures of the accompanying drawings, in which like references indicate similar elements and in which.

DETAILED DESCRIPTION

Figure 1:
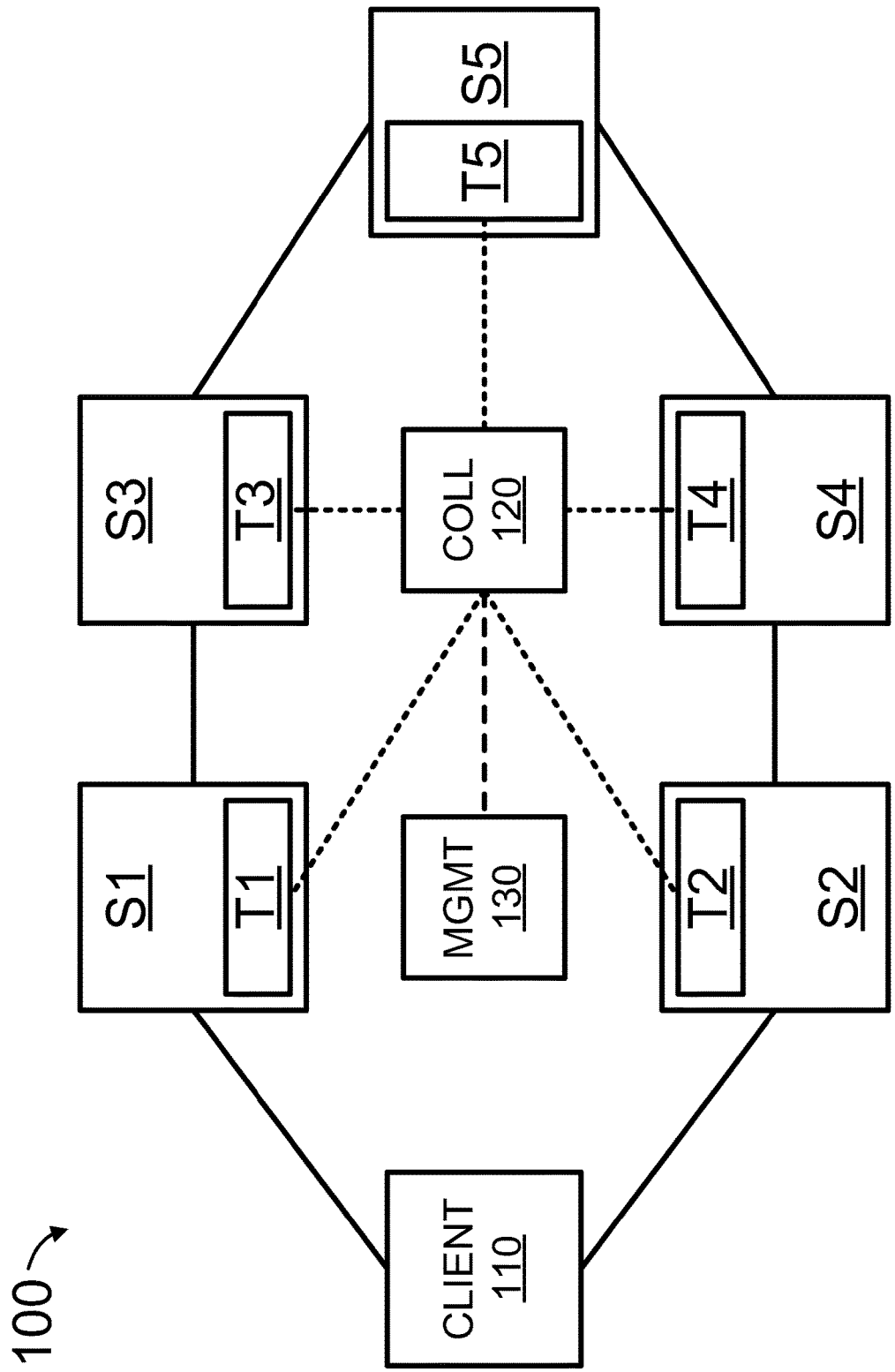
FIG. 1 is a simplified block diagram of a system for tracking client application utilization of microservices, according to some embodiments.

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated. The terminology used herein is for the purpose of describing particular embodiments only and is not intended to be limiting of the technology. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, components, and/or groups thereof. It will be understood that like or analogous elements and/or components, referred to herein, may be identified throughout the drawings with like reference characters. It will be further understood that several of the figures are merely schematic representations of the present technology. As such, some of the components may have been distorted from their actual scale for pictorial clarity.

FIG. 1 shows system 100 for tracking microservices utilization, according to some embodiments. System 100 includes client application 110, microservices S1-S5, collector 120, and management 130. Client application 110 can be a computer program—which can run on computing system such as desktop computer, laptop computer, tablet computer, phablet, smart phone, smart appliance, gaming console, and the like—and can be a computer program designed to perform a group of coordinated functions, tasks, or activities for the benefit of the user. Alternatively or additionally, client application 110 can be a web browser (or similar) running on a computing system and can access a web page, where the web page provides the functionality or service otherwise offered by a computer program performing a group of coordinated functions, tasks, or activities for the benefit of the user. Computing systems are described further in relation to FIG. 7.

Microservices S1-S5 are microservices which can work together to perform a server application (not depicted in FIG. 1). The server application is split into a set of smaller, interconnected microservices such as microservices S1-S5. Each of microservices S1-S5 is a mini-application that can expose an application programming interface (API) for consumption by other microservices (of microservices S1-S5) and/or by client application 110. In contrast to a monolithic application having all of its functionality in one process, an application having a microservices architecture puts each element of functionality into a separate microservice (e.g., microservices S1-S5).

When a monolithic application is scaled, the whole and complete monolithic application is replicated for each and every instance. An application having a microservices architecture can scale by adding (commissioning) and/or subtracting (decommissioning) various combinations and permutations of its microservices, as needed. While a monolithic application can have a logically modular architecture, it is packaged and deployed as a monolith (i.e., in its entirety) and does not have a microservices architecture.

Each of microservice S1-S5, collector 120, and management 130 can be run on a virtual machine, container, and/or hardware server. Virtual machines provide a substitute for a physical computing system and the functionality needed to execute entire operating systems. Virtual machines are created and run by a hypervisor which uses native execution to share and manage hardware, allowing for multiple environments which are isolated from one another, yet can exist on the same physical computing system.

Containers are an operating system-level virtualization method for deploying and running distributed applications without launching an entire virtual machine for each application. Containers can look like real computers from the point of view of programs running in them. Generally, a computer program running on an ordinary operating system can see all resources (e.g., connected devices, files and folders, network shares, CPU power, etc.) of that computer. However, programs running inside a container can only see the container's contents and devices assigned to the container. Containers can be arranged, coordinated, and managed by container orchestration (e.g., Kubernetes, Amazon Elastic Container Service, Docker Swarm, and the like). In contrast to hypervisor-based virtualization, containers may be an abstraction performed at the operating system (OS) level, whereas virtual machines are an abstraction of physical hardware.

Generally, client application 110 may only "see" one URL (e.g., to microservice S1 or microservice S2). However, microservice S1 or S2 may then in turn communicate with multiple other microservices and so on. Trace programs T1-T5 can be used to measure latency among microservices S1-S5.

Each of microservices S1-S5 can include a trace program T1-T5. Trace programs T1-T5 can record timing data about requests and responses to requests to and from microservices S1-S5. By way of non-limiting example, trace programs T1-T5 can capture data associated with a finished hop (span), referred to as a completed hop (span) record, such as a source (origin), destination (where request and/or response is going or being sent), duration (latency, such how much time has elapsed between when a request is sent and a response to the request is received), start time stamp, end time stamp, and the like. Each completed hop (span) record can further include a trace identification and a hop (span) identification. The trace identification and hop identification are described further below.

The hop identification can be randomly generated and/or can uniquely identify each request or response to a request (and its associated data, such as source, destination, duration, start time stamp, end time stamp, and the like). For example, a hop identification is eight ASCII characters encoded in hexadecimal. As illustrated in FIG. 1, a hop (span) can be from microservice S1 to microservice S3, microservice S3 to microservice S5, microservice S5 to microservice S3, and microservice S3 to microservice S1. By way of further non-limiting example, a hop (span) can be from microservice S2 to microservice S4, microservice S4 to microservice S5, microservice S5 to microservice S4, and microservice S4 to microservice S2.

Each path or route (e.g., from microservice S1 to microservice S5) is assigned a (random) trace identification. For example, the trace identification can be 128-bits long and encoded in hexadecimal. However, a randomly assigned trace identification does not provide insight into which applications are using which microservices (e.g., microservices may be used by multiple different client applications and each client application imposes a different burden) and how often each microservice is used by a particular client application, among others.

In some embodiments, client application can advantageously include a (non-random) trace identification when it sends a request to a microservice. In this way, stress on a particular microservice (by a particular client application) can be identified. Moreover, performance of a client application can be improved by identifying microservices having high latency. For example, instances of a particular microservice (e.g., microservices S1-S5) can be added to (commissioned) or subtracted (decommissioned) from system 100. In addition, aggregated data from small-scale usage of the client application (e.g., test cases, trial runs, alpha testing, beta testing, and the like) can be scaled up to forecast/predict greater usage (e.g., from a full production release).

For example, the trace identification can include an identifier for client application 110 (e.g., application name, such as eight ASCII characters encoded in hexadecimal) and the server to which the request is sent. In communication between client application 110 and an initial microservice (e.g., microservice S1 and/or S2), client application 110 will send a trace identification identifying itself and the initial microservice. For a request sent from client application 110 to microservice S1, the trace identification can be APPL-NAME_S1 For a request sent from client application 110 to microservice S2, the trace identification can be APPL-NAME_S2. The trace identification will follow (be used) for communications that originate from a particular client application (e.g., client application 110), as each hop communication is propagated by microservices (e.g., of microservices S1-S5) until the end of the session.

Trace programs T1-T5 propagate trace identification in-band (e.g., sent in each hop (span) along with a request and/or response to a request). Trace programs T1-T5 can send data about completed hops (spans) out of band (e.g., independent from the main in-band data stream, asynchronously) to collector 120. For example, trace programs T1-T5 can send hop (span) data using Hypertext Transfer Protocol (HTTP), Apache Kafka, Scribe, and the like. Collector 120 can receive hop data from each of trace programs T1-T5, validate it, store it (e.g., in a database such as Cassandra, ElasticSearch, MySQL, and the like), and index it.

Management 130 can request latency data from collector 120, aggregate the hop data to produce trace data, and store the trace data (e.g., in a database such as Cassandra, ElasticSearch, MySQL, and the like).

The arrangement of system 100 shown in FIG. 1 is purely for illustrative purposes and is not intended to be limiting. Different numbers of client applications, microservices, and connections between them can be used. In some embodiments, a trace system can be Zipkin and microservices S1-S5 can be referred to as instrumented clients.

Figure 2:
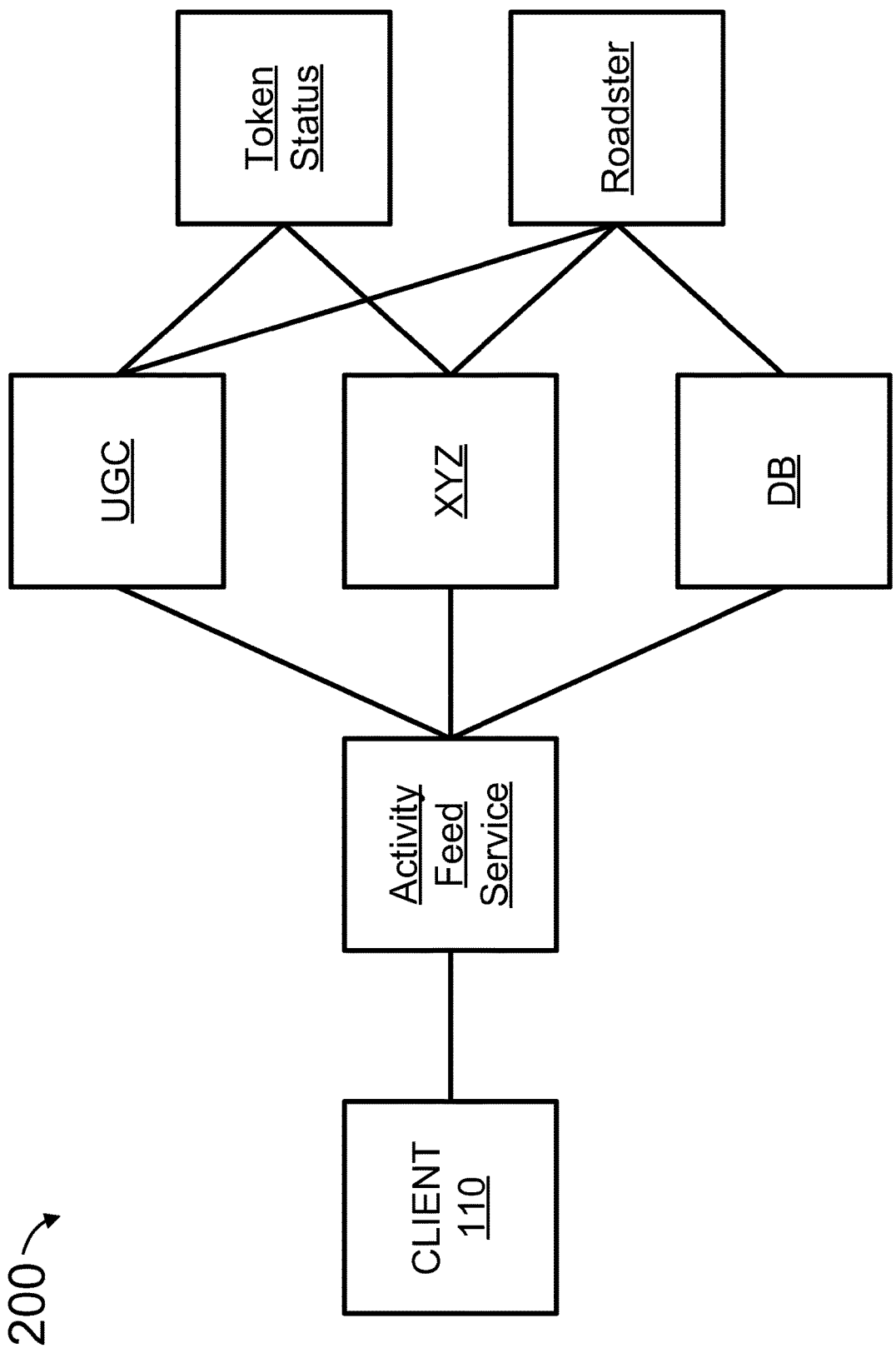
FIG. 2 is a simplified block diagram of a system for tracking client application utilization of microservices, according to various embodiments.

FIG. 2 depicts system 200 for tracking microservices utilization, according to some embodiments. System 200 can have at least some of the characteristics of system 100 described above in relation to FIG. 1. System 200 includes client application Unibeam (identified as client 110 in FIG. 2) and microservices Activity Feed Service, UGC, XYZ, DB, Token Status, and Roadster.

Figure 3:
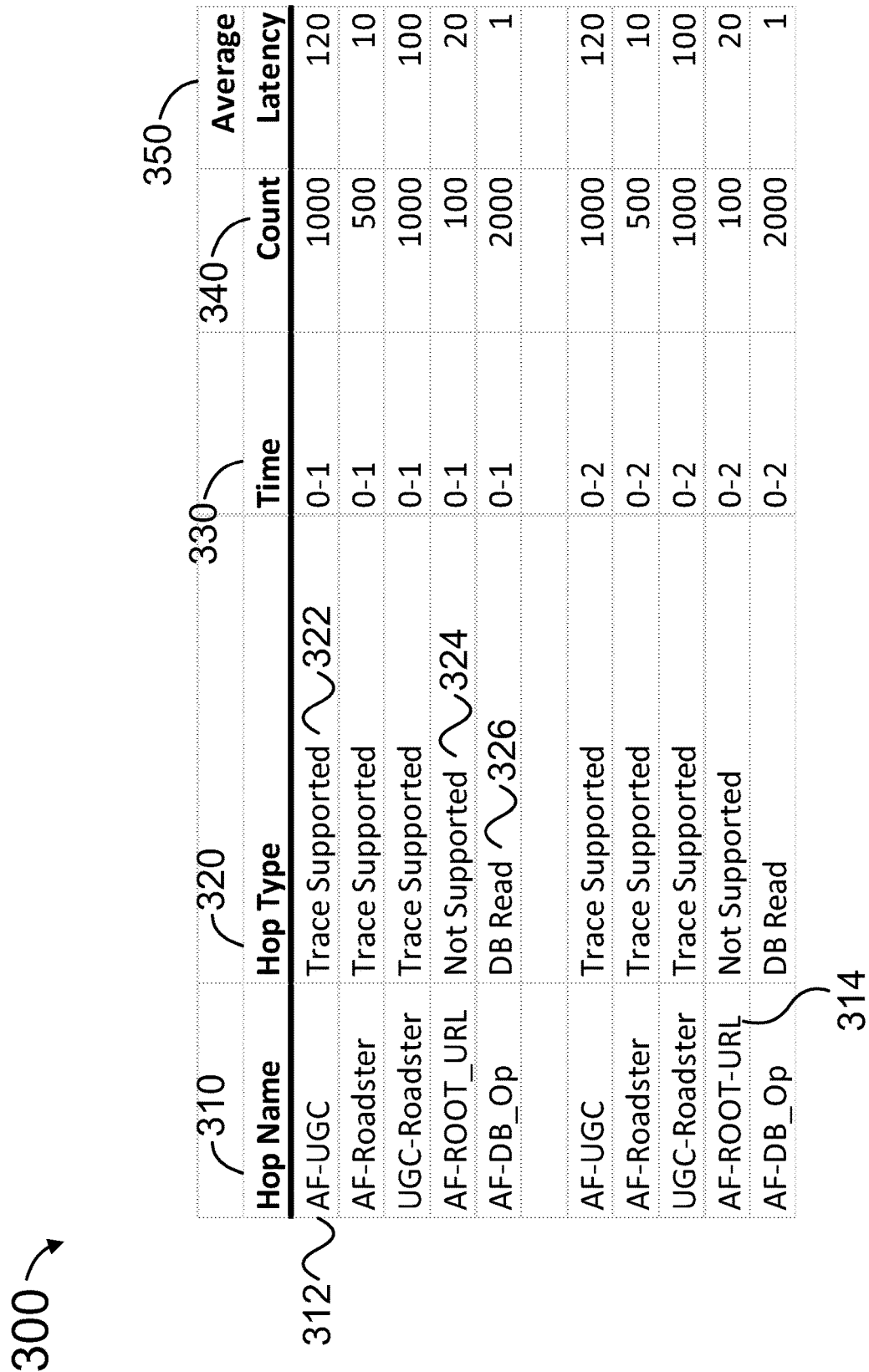
FIG. 3 is an example of aggregated trace data, in accordance with some embodiments.

FIG. 3 illustrates aggregated trace data 300 associated with system 200 (FIG. 2), for example, produced by management 130 (FIG. 1). Aggregated trace data 300 is associated with client application Unibeam 110 (FIG. 2). Column Hop Name 310 shows the two microservices in the hop. For example, AF-UGC 312 can be the hop between Activity Feed Service and UGC 110 (FIG. 2). ROOT_URL 314 can mean an external (micro)service is used (e.g., provisioned by a third-party, such as Google™, Facebook™, and the like). Column Hop Type 320 shows the type of hop. For example, Trace Supported 322 can mean the hop endpoint includes a trace program (e.g., one of trace programs T1-T5 in FIG. 1). Not Supported 324 can mean the hop endpoint does not include a trace program (e.g., one of trace programs T1-T5 in FIG. 1). When a trace program is not included in a (micro)service, information (e.g., count and average latency) can be inferred from data recorded by the hop starting point. DB Read 326 can mean a database was read from.

Column Time 330 identifies sequential intervals of time (e.g., 0-1, 1-2, and so on) to which the row of data pertains. The slice of time can be any interval of time, such as 30 minutes, 2 hours, 5 days, 3 weeks, three months, etc. Column Count 340 shows the number of times client application Unibeam 110 (FIG. 2) used a particular hop. Column Average Latency 350 shows the amount of time that elapsed between when a request was sent and when a response to the request was received (latency). The amount of time can be in any unit of time (e.g., seconds, microseconds, nanoseconds, picoseconds, and the like).

Figure 4:
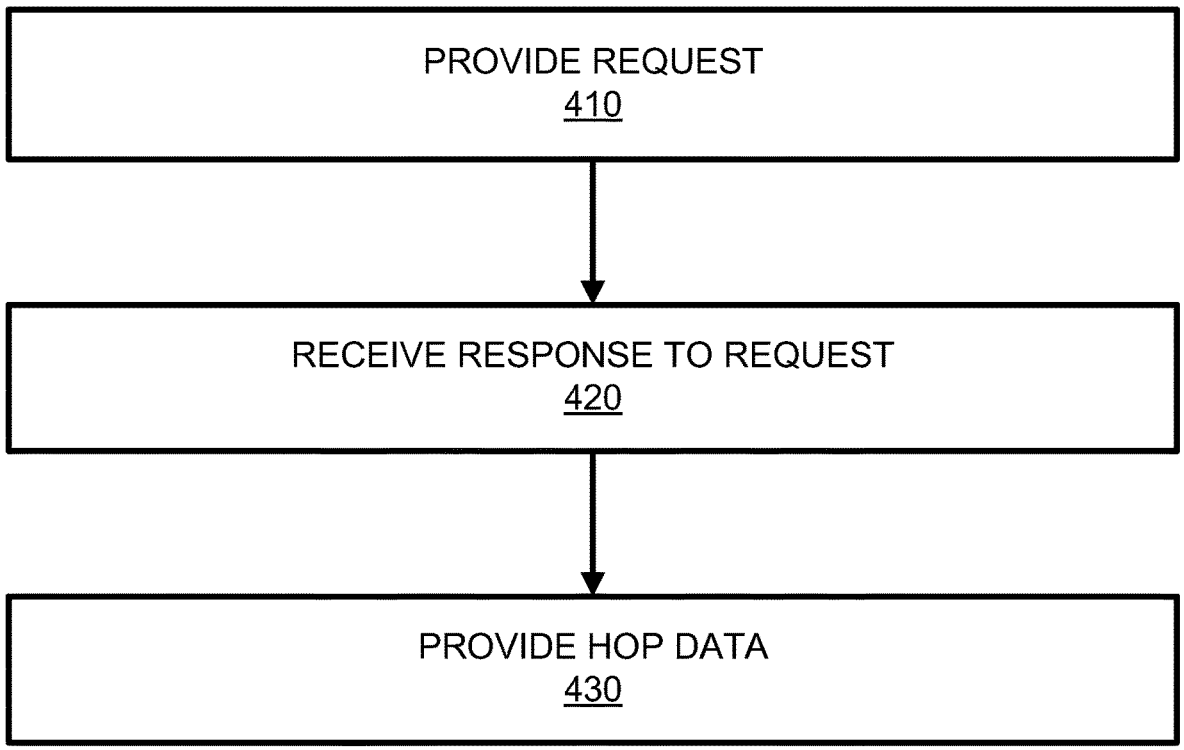
FIG. 4 is a simplified flow diagram of a method for recording hop data, in accordance with various embodiments.

FIG. 4 is a simplified flow diagram of a method 400 for recording hop (span) data, such as in systems 100 and 200 in FIGS. 1 and 2, respectively. In some embodiments, method 400 can be (concurrently) performed by at least some of trace programs T1-T5 (FIG. 1), such that system 100 and 200 in FIGS. 1 and 2 can be said to be distributed tracing systems. At step 410, a request can be provided, such as to another microservice (e.g., microservices S1-S5 in FIG. 1). The request can include an existing trace identification and/or hop identification. When a trace identification and/or hop identification is not provided, a random a trace identification and/or hop identification can be generated and associated with the hop (span). The request can further include a source and destination. When the request is provided, a start time stamp can be recorded.

At step 420, a response to the request can be received. For example, the response can be received from the microservice that the request in step 410 was sent to. When the response is received, an end time stamp can be recorded. In some embodiments, the duration can be recorded. For example, the duration can be determined from the start and end time stamps, measured using a timer function, and the like.

At step 430, the completed hop (span) data record (e.g., a trace identification, hop identification, source, destination, duration, start time stamp, end time stamp, and the like) can be provided. In some embodiments, the completed hop (span) data record is provided to collector 120 (FIG. 1). Completed hop (span) data records may be used in method 500 (FIG. 5)

Figure 5:
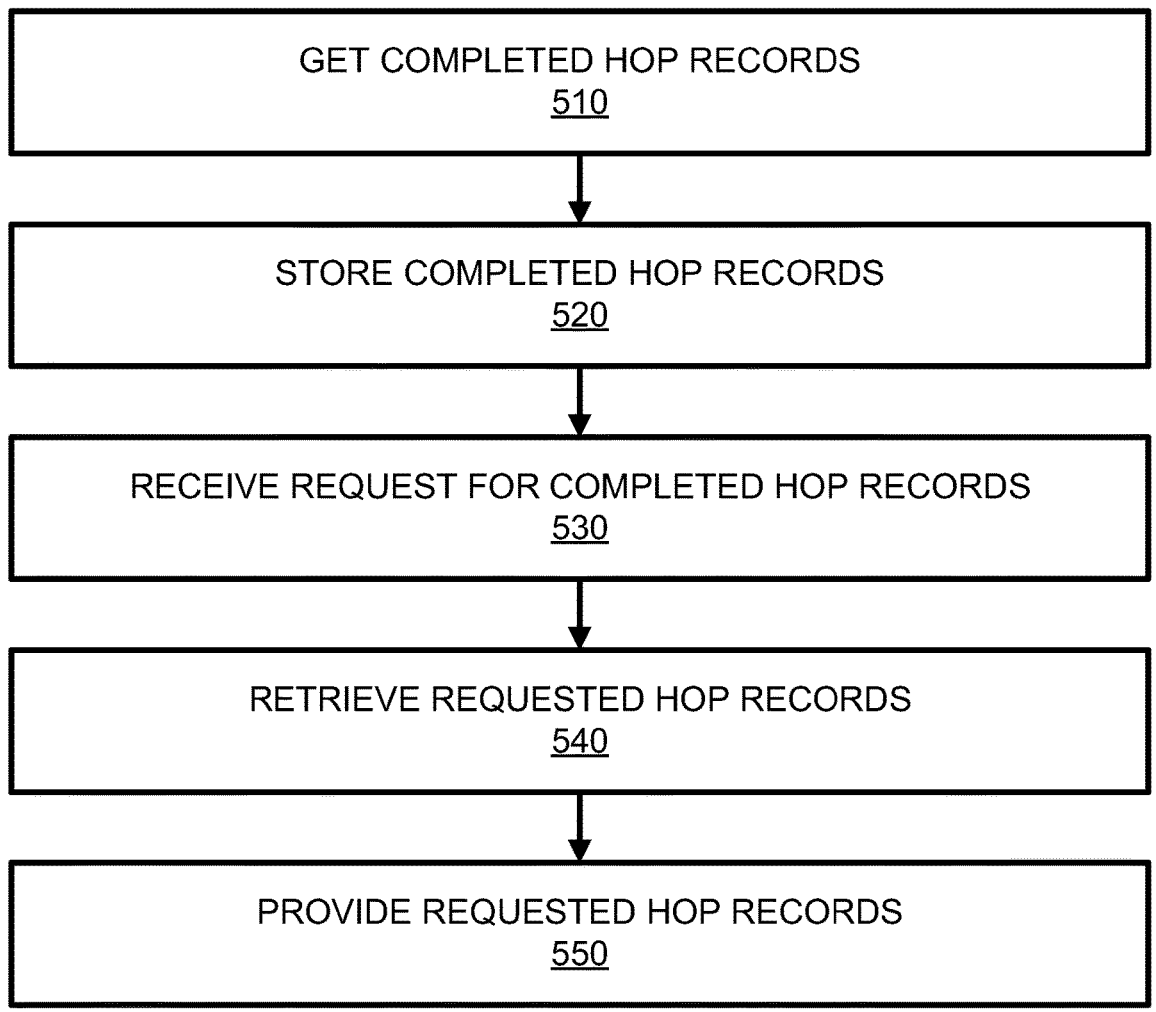
FIG. 5 is a simplified flow diagram of a method for collecting completed hop data, according to some embodiments.

FIG. 5 illustrates method 500 for collecting completed hop (span) data according to some embodiments. In some embodiments, method 500 can be performed by collector 120 (FIG. 1). At step 510, completed hop (span) data records can be received from a (plurality of) trace programs (e.g., trace programs T1-T5). At step 520, the received completed hop (span) data records can be stored in a database (e.g., Cassandra, ElasticSearch, MySQL, and the like).

At step 530, a request for completed hop (span) data records can be received (e.g., from management 130 in FIG. 1). In some embodiments, the request includes a time frame (e.g., between a start date and time, and an end data and time) for the requested data. At step 540, the requested data records are retrieved (e.g., from the database in which it is stored). At step 550, the retrieved data records are provided (e.g., to management 130). The retrieved data records can be used in method 600 (FIG. 1).

Figure 6:
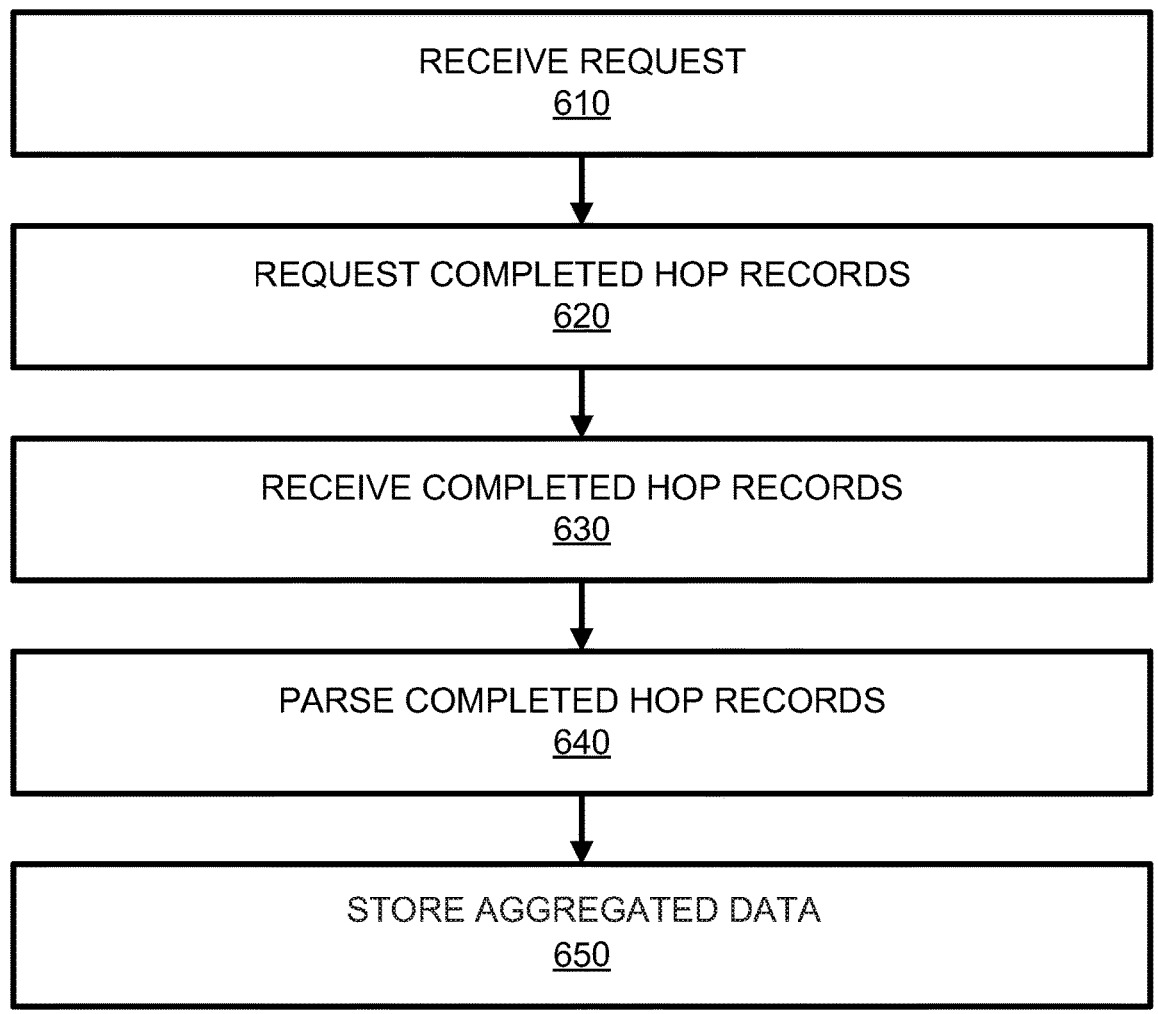
FIG. 6 is a simplified flow diagram of a method for tracking microservice usage, according to various embodiments.

FIG. 6 illustrates method 600 for tracking microservice utilization, in accordance with some embodiments. In some embodiments, method 600 can be performed by management 130 (FIG. 1). At step 610, an indicia (identified as "requested" in FIG. 6) is received from a user to track latency associated with a client application (e.g., in systems 100 and 200 in FIGS. 1 and 2, respectively). For example, the request can include a start date and time, and an end date and time.

At step 620, completed hop data records can be requested (e.g., from collector 120 in FIG. 2). At step 630, the requested completed hop data records can be received (e.g., from collector 120 in FIG. 2).

At step 640, the received completed hop data can be parsed and aggregated. For example, the completed hop data can be parsed such that just records (e.g., rows) pertaining to a particular client application are used. By way of further non-limiting example, the data can be grouped into intervals of time using the start and/or end time stamps, the number of instances of a particular hop (span) can be totaled, and the average duration can be calculated.

At step 650, the aggregated data can be stored, for example, in a database (e.g., Cassandra, ElasticSearch, MySQL, and the like). A non-limiting example of data aggregated using method 600 is depicted in FIG. 3.

Figure 7:
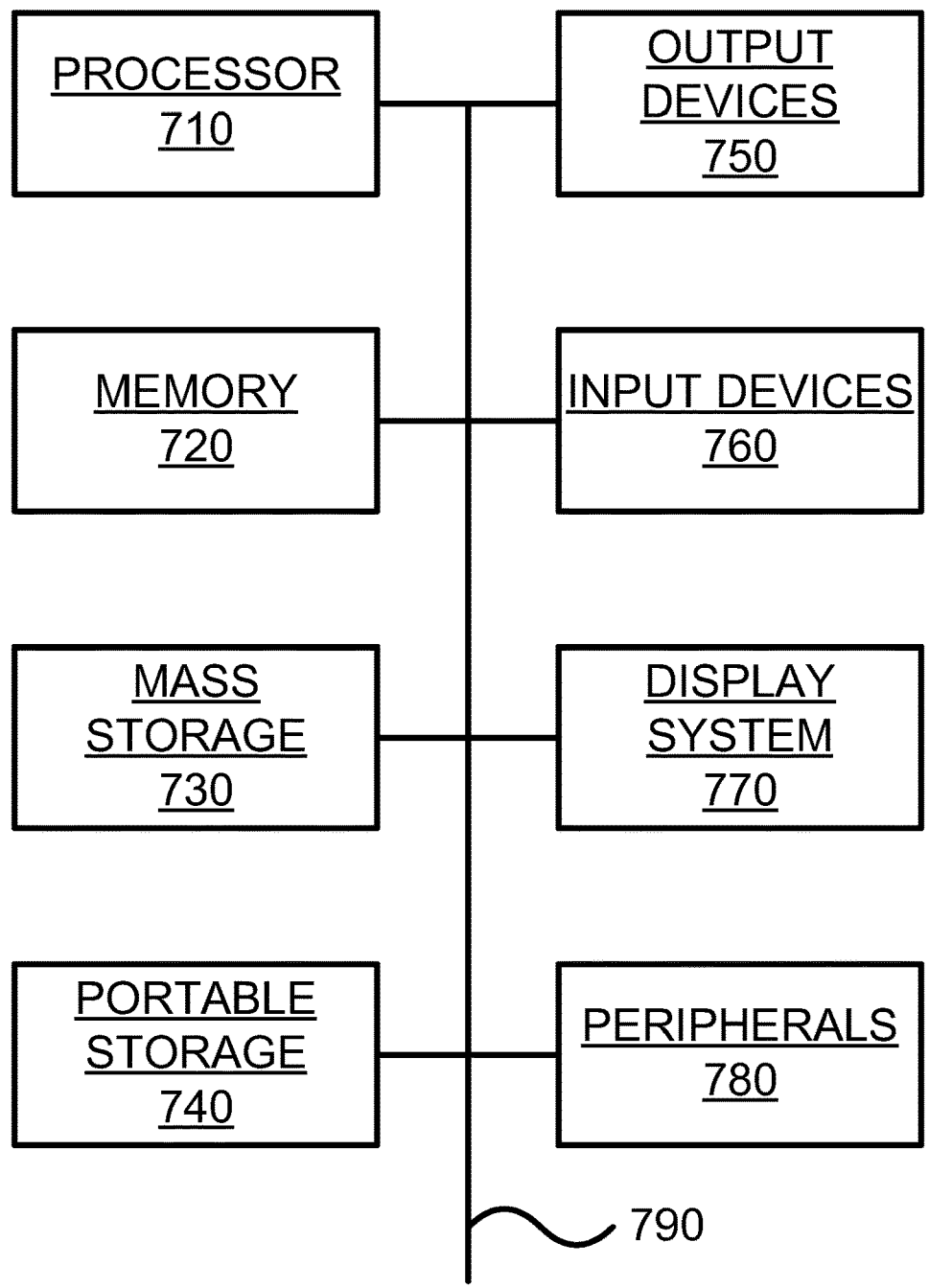
FIG. 7 is a simplified block diagram of a computing system, in accordance with some embodiments.

FIG. 7 illustrates an exemplary computer system 700 that may be used to implement some embodiments of the present invention. The computer system 700 in FIG. 7 may be implemented in the contexts of the likes of computing systems, networks, servers, or combinations thereof. The computer system 700 in FIG. 7 includes one or more processor unit(s) 710 and main memory 720. Main memory 720 stores, in part, instructions and data for execution by processor unit(s) 710. Main memory 720 stores the executable code when in operation, in this example. The computer system 700 in FIG. 7 further includes a mass data storage 730, portable storage device 740, output devices 750, user input devices 760, a graphics display system 770, and peripheral device(s) 780.

The components shown in FIG. 7 are depicted as being connected via a single bus 790. The components may be connected through one or more data transport means. Processor unit(s) 710 and main memory 720 are connected via a local microprocessor bus, and the mass data storage 730, peripheral device(s) 780, portable storage device 740, and graphics display system 770 are connected via one or more input/output (I/O) buses.

Mass data storage 730, which can be implemented with a magnetic disk drive, solid state drive, or an optical disk drive, is a non-volatile storage device for storing data and instructions for use by processor unit(s) 710. Mass data storage 730 stores the system software for implementing embodiments of the present disclosure for purposes of loading that software into main memory 720.

Portable storage device 740 operates in conjunction with a portable non-volatile storage medium, such as a flash drive, floppy disk, compact disk, digital video disc, or Universal Serial Bus (USB) storage device, to input and output data and code to and from the computer system 700 in FIG. 7. The system software for implementing embodiments of the present disclosure is stored on such a portable medium and input to the computer system 700 via the portable storage device 740.

User input devices 760 can provide a portion of a user interface. User input devices 760 may include one or more microphones, an alphanumeric keypad, such as a keyboard, for inputting alphanumeric and other information, or a pointing device, such as a mouse, a trackball, stylus, or cursor direction keys. User input devices 760 can also include a touchscreen. Additionally, the computer system 700 as shown in FIG. 7 includes output devices 750. Suitable output devices 750 include speakers, printers, network interfaces, and monitors.

Graphics display system 770 include a liquid crystal display (LCD) or other suitable display device. Graphics display system 770 is configurable to receive textual and graphical information and processes the information for output to the display device.

Peripheral device(s) 780 may include any type of computer support device to add additional functionality to the computer system.

The components provided in the computer system 700 in FIG. 7 are those typically found in computer systems that may be suitable for use with embodiments of the present disclosure and are intended to represent a broad category of such computer components that are well known in the art. Thus, the computer system 700 in FIG. 7 can be a personal computer (PC), hand held computer system, telephone, mobile computer system, workstation, tablet, phablet, mobile phone, server, minicomputer, mainframe computer, wearable, or any other computer system. The computer may also include different bus configurations, networked platforms, multi-processor platforms, and the like. Various operating systems may be used including UNIX, LINUX, WINDOWS, MAC OS, PALM OS, QNX ANDROID, IOS, CHROME, and other suitable operating systems.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the technology. Those skilled in the art are familiar with instructions, processor(s), and storage media.

In some embodiments, the computing system 700 may be implemented as a cloud-based computing environment, such as a virtual machine operating within a computing cloud. In other embodiments, the computing system 700 may itself include a cloud-based computing environment, where the functionalities of the computing system 700 are executed in a distributed fashion. Thus, the computing system 700, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud is formed, for example, by a network of web servers that comprise a plurality of computing devices, such as the computing system 700, with each server (or at least a plurality thereof) providing processor and/or storage resources. These servers manage workloads provided by multiple users (e.g., cloud resource customers or other users). Typically, each user places workload demands upon the cloud that vary in real-time, sometimes dramatically. The nature and extent of these variations typically depends on the type of business associated with the user.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media and transmission media. Non-volatile media include, for example, optical, magnetic, and solid-state disks, such as a fixed disk. Volatile media include dynamic memory, such as system random-access memory (RAM). Transmission media include coaxial cables, copper wire and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-ROM disk, digital video disk (DVD), any other optical medium, any other physical medium with patterns of marks or holes, a RAM, a programmable read-only memory (PROM), an erasable programmable read-only memory (EPROM), an electrically erasable programmable read-only memory (EEPROM), a Flash memory, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Computer program code for carrying out operations for aspects of the present technology may be written in any combination of one or more programming languages, including an object oriented programming language such as JAVA, SMALLTALK, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the invention in the form disclosed. Many modifications and variations will be apparent to those of ordinary skill in the art without departing from the scope and spirit of the invention. Exemplary embodiments were chosen and described in order to best explain the principles of the present technology and its practical application, and to enable others of ordinary skill in the art to understand the invention for various embodiments with various modifications as are suited to the particular use contemplated.

Aspects of the present technology are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present technology. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The description of the present technology has been presented for purposes of illustration and description, but is not intended to be exhaustive or limited to the invention in the form disclosed. Many modifications and variations will be apparent to those of ordinary skill in the art without departing from the scope and spirit of the invention. Exemplary embodiments were chosen and described in order to best explain the principles of the present technology and its practical application, and to enable others of ordinary skill in the art to understand the invention for various embodiments with various modifications as are suited to the particular use contemplated.

What is claimed is:

1. A computer-implemented method for tracking microservice usage comprising:
   requesting completed hop data records, the completed hop data records being associated with a plurality of microservices, a hop being between two microservices of the plurality of microservices;
   receiving the completed hop data records;
   aggregating the completed hop data records to identify hop data records associated with a client application, to count a number of instances the client application utilized each microservice of the plurality of microservices, and to calculate an average latency for each of the hops; and
   provisioning and/or decommissioning instances of the plurality of microservices using the aggregated hop data records.

2. The computer-implemented method of claim 1, wherein the completed hop data records are collected using a method comprising:
   receiving the completed hop data records from trace programs associated with a respective one of the plurality of microservices, the completed hop data records being sent asynchronously by the trace programs.

3. The computer-implemented method of claim 2, wherein the completed hop data records are collectively produced by the trace programs each using a method comprising:
   logging a start time stamp when a request is sent;
   logging an end time stamp when a response to the request is received;
   calculating a duration using the start time stamp and the end time stamp; and
   assembling a completed hop data record including a trace identification, a hop identification, a source, a destination, the duration, the start time stamp, and the end time stamp.

4. The computer implemented method of claim 3, wherein the trace identification includes an identifier of the client application.

5. The computer-implemented method of claim 3, wherein the trace identification is 128-bits long and encoded in hexadecimal.

6. The computer implemented method of claim 1, wherein the plurality of microservices collectively perform a server application.

7. The computer implemented method of claim 1, wherein each of the plurality of microservices is running in a container.

8. The computer implemented method of claim 1, wherein at least one of the microservices of the plurality of microservices is provisioned by a third party.

9. The computer implemented method of claim 1, the method further comprising:

storing the aggregated hop data records in a database.

10. The computer implemented method of claim 1, wherein at least some of the microservices of the plurality of microservices communicate with each other using an application programming interface (API).

11. A system comprising:

a processor; and a memory coupled to the processor and storing a program executable by the processor to perform a method for tracking microservice usage comprising:

requesting completed hop data records, the completed hop data records being associated with a plurality of microservices, a hop being between two microservices of the plurality of microservices;

receiving the completed hop data records;

aggregating the completed hop data records to identify hop data records associated with a client application, to count a number of instances the client application utilized each microservice of the plurality of microservices, and to calculate an average latency for each of the hops; and provisioning and/or decommissioning instances of the plurality of microservices using the aggregated hop data records.

12. The system of claim 11, wherein the completed hop data records are collected using a method comprising:

receiving the completed hop data records from trace programs associated with a respective one of the plurality of microservices, the completed hop data records being sent asynchronously by the trace programs.

13. The system of claim 12, wherein the completed hop data records are collectively produced by the trace programs each using a method comprising:

logging a start time stamp when a request is sent;

logging an end time stamp when a response to the request is received;

calculating a duration using the start time stamp and the end time stamp; and assembling a completed hop data record including a trace identification, a hop identification, a source, a destination, the duration, the start time stamp, and the end time stamp.

14. The system of claim 13, wherein the trace identification includes an identifier of the client application.

15. The system of claim 14, wherein the trace identification is 128-bits long and encoded in hexadecimal.

16. The system of claim 11, wherein the plurality of microservices collectively perform a server application.

17. The system of claim 11, wherein each of the plurality of microservices is running in a container.

18. The system of claim 11, wherein at least one of the microservices of the plurality of microservices is provisioned by a third party.

19. The system of claim 11, the method further comprising:

storing the aggregated hop data records in a database.

20. A non-transitory computer-readable storage medium having embodied thereon a program, the program being executable by a processor to perform a method for tracking microservice usage, the method comprising:

requesting completed hop data records, the completed hop data records being associated with a plurality of microservices, a hop being between two microservices of the plurality of microservices;

receiving completed hop data records;

aggregating the completed hop data records to identify hop data records associated with a client application, to count a number of instances the client application utilized each microservice of the plurality of microservices, and to calculate an average latency for each of the hops; and provisioning and/or decommissioning instances of the plurality of microservices using the aggregated hop data.

* * * * *